United States Patent [19]
Mowry

[11] Patent Number: 6,157,598
[45] Date of Patent: Dec. 5, 2000

[54] LENS FOR OPTICAL DATA STORAGE SYSTEM

[75] Inventor: Gregory S. Mowry, Burnsville, Minn.

[73] Assignee: Seagate Technology LLC, Scotts Valley, Calif.

[21] Appl. No.: 09/511,581

[22] Filed: Feb. 23, 2000

Related U.S. Application Data

[62] Division of application No. 09/251,805, Feb. 17, 1999, which is a division of application No. 08/911,556, Aug. 14, 1997, Pat. No. 5,917,788
[60] Provisional application No. 60/039,934, Mar. 10, 1997.
[51] Int. Cl.$^7$ .................................................. G11B 7/12
[52] U.S. Cl. ........................ 369/44.23; 369/44.14; 369/112; 369/44.15
[58] Field of Search ........................... 369/44.23, 44.14, 369/44.12, 44.15, 44.16, 44.19, 44.21, 44.22, 109, 112

[56] References Cited

U.S. PATENT DOCUMENTS

| | | | |
|---|---|---|---|
| 3,980,811 | 9/1976 | Schaefer et al. ................ | 178/6.6 |
| 4,229,067 | 10/1980 | Love .............................. | 350/96.15 |
| 4,310,916 | 1/1982 | Dil .................................. | 369/109 |
| 4,443,700 | 4/1984 | Macedo et al. ................ | 250/227 |
| 4,457,590 | 7/1984 | Moore ............................ | 350/413 |
| 4,569,038 | 2/1986 | Nagashima et al. ........... | 369/44 |
| 4,581,529 | 4/1986 | Gordon ......................... | 250/227 |
| 4,613,212 | 9/1986 | Norikazu ...................... | 350/432 |
| 4,701,032 | 10/1987 | Takada .......................... | 350/413 |
| 4,706,235 | 11/1987 | Melbye ......................... | 369/46 |
| 4,769,800 | 9/1988 | Moser et al. .................. | 369/32 |
| 4,799,210 | 1/1989 | Wilson et al. ................. | 369/110 |
| 4,815,064 | 3/1989 | Melbye ......................... | 369/59 |
| 4,855,987 | 8/1989 | Versluis ........................ | 369/112 |
| 4,933,537 | 6/1990 | Takahashi et al. ............ | 235/454 |
| 4,994,658 | 2/1991 | Takahashi et al. ............ | 235/473 |
| 5,004,307 | 4/1991 | Kino et al. .................... | 350/1.2 |
| 5,050,970 | 9/1991 | Kittaka ......................... | 359/653 |
| 5,096,277 | 3/1992 | Kleinerman .................. | 385/12 |
| 5,125,750 | 6/1992 | Corle et al. ................... | 359/819 |
| 5,138,676 | 8/1992 | Stowe et al. .................. | 385/32 |
| 5,153,870 | 10/1992 | Lee et al. ...................... | 369/111 |
| 5,193,132 | 3/1993 | Uken et al. .................... | 385/32 |
| 5,212,379 | 5/1993 | Nafarrate et al. ............. | 250/227.14 |
| 5,278,812 | 1/1994 | Adar et al. .................... | 369/44.12 |
| 5,286,971 | 2/1994 | Betzig et al. .................. | 250/227.26 |
| 5,363,463 | 11/1994 | Kleinerman .................. | 385/123 |
| 5,450,203 | 9/1995 | Penkethman .................. | 356/373 |
| 5,493,393 | 2/1996 | Beranek et al. ............... | 356/328 |
| 5,497,359 | 3/1996 | Mamin et al. ................. | 369/44.15 |
| 5,526,338 | 6/1996 | Hasman et al. ............... | 369/109 |
| 5,535,189 | 7/1996 | Alon et al. .................... | 369/102 |
| 5,537,385 | 7/1996 | Alon et al. .................... | 369/119 |
| 5,566,159 | 10/1996 | Shapira ......................... | 369/99 |
| 5,574,712 | 11/1996 | Alon et al. .................... | 369/102 |
| 5,592,444 | 1/1997 | Alon et al. .................... | 369/13 |
| 5,598,393 | 1/1997 | Alon et al. .................... | 369/102 |
| 5,729,393 | 3/1998 | Lee et al. ...................... | 369/44.15 |
| 5,818,592 | 10/1998 | Womack et al. .............. | 356/357 |
| 5,828,644 | 10/1998 | Gage et al. .................... | 369/44.15 |
| 5,881,042 | 3/1999 | Knight ........................... | 369/99 |
| 5,936,928 | 8/1999 | Jain et al. ...................... | 369/99 |
| 5,946,282 | 8/1999 | Hirono et al. ................. | 369/112 |

*Primary Examiner*—Muhammad Edun
*Attorney, Agent, or Firm*—Westman, Champlin & Kelly, P.A.

[57] ABSTRACT

An optical data storage system includes an optical disc which stores information in optically readable format on a data surface. A slider is provided proximate the data surface of the optical disc and is coupled to an actuator for selectively positioning the slider relative to the data surface. A Solid Immersion Lens couples to the slider and is arranged to couple light to the data surface of the optical disc. The Solid Immersion Lens is non-hemispherical.

15 Claims, 2 Drawing Sheets

LENS FOR OPTICAL DATA STORAGE SYSTEM

This is a Divisional patent application of U.S. Ser. No. 09/251,805, filed Feb. 17, 1999 which is a Divisional patent application of U.S. Ser. No. 08/911,556, filed Aug. 14, 1997, now U.S. Pat. No. 5,917,788, which is based on Provisional Application Serial No. 60/039,934 filed on Mar. 10, 1997.

BACKGROUND OF THE INVENTION

The present invention relates generally to optical disc data storage systems. More specifically, the present invention relates to optical storage systems which utilize a Solid Immersion Lens (SIL) for focusing light onto a data surface of the disc.

Optical data storage disc systems are a promising technology for storing large quantities of data. The data is accessed by focusing a laser beam onto a data surface of the disc and analyzing light reflected from or transmitted through the data surface.

In general, in optical storage systems, data is in the form of marks carried on the surface of the disc which are detected using the reflected laser light. There are a number of different optical disc technologies which are known in the industry. For example, compact discs are currently used to store digital data such as computer programs or digitized music. Typically, compact discs are permanently recorded during manufacture. Another type of optical system is a write-once read-many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the storage medium.

The above systems require a beam of light to be focused onto a data surface of a disc and recovering the reflected light. Storage density is determined not only be the size of the markings on the data surface, but also by the size of the beam focused on the surface (i.e. resolution). One type of optical element which can be used in conjunction with an objective lens to reduce the ultimate spot size of the light beam is a Solid Immersion Lens or SIL. A SIL reduces the beam spot size by virtue of the wavelength reduction which occurs when light is inside an optically dense medium. The SIL is positioned very close to the data surface of the disc and couples light to the disc surface via evanescent wave effects. This is often referred to as the "near-field" regime. The use of SILs for data storage is described in U.S. Pat. No. 5,125,750 to Corle et al. which issued Jun. 30, 1992 and in U.S. Pat. No. 5,497,359 to Mamin et al. which issued Mar. 5, 1996. In these optical systems, a laser beam is focused onto the SIL using an objective lens. The SIL is preferably carried on a slider and the slider is positioned close to the disc data surface.

In optical storage systems, it is typically preferred to move the beam between adjacent tracks without moving the slider. This allows more accurate and faster tracking control. However, the SILs of prior art optical systems have been designed to optimize spot size, without regard to off-axis performance.

SUMMARY OF THE INVENTION

The present invention includes an optical data storage system having an optical disc for storing information in an optically readable format on a data surface. A slider is positioned adjacent to the data surface of the optical disc and is coupled to an actuator which selectively positions the slider relative to the data surface. The system also includes a light source. A lens for near-field coupling light to the data surface is mounted on the slider. The lens comprises a Solid Immersion Lens (SIL) having a non-hemispherical surface directed toward the light source and an opposing surface. The opposing surface is positioned sufficiently close to the data surface for near field coupling to the data surface. A separate objective lens is positioned between the SIL and the light source. The objective lens and the SIL are selected to improve off-axis performance.

DETAILED DESCRIPTION OF THE PREFERRED EMBODIMENTS

Figure 1:
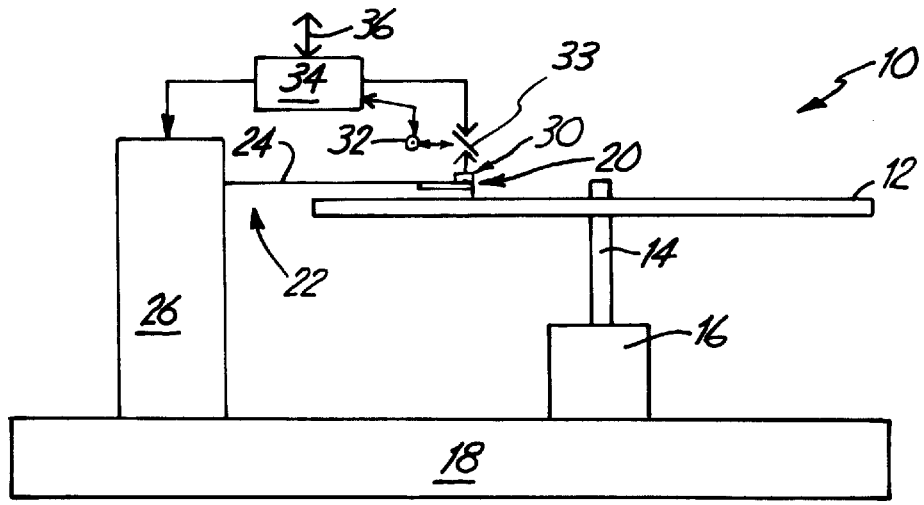
FIG. 1 is a simplified diagram showing an optical storage system using a SIL in accordance with one embodiment of the present invention.

The present invention relates to optical data storage systems. More specifically, the present invention relates to lenses which are used for optically coupling to a data surface of a storage medium using the optical "near-field." One lens for such coupling is a Solid Immersion Lens (SIL). The use of Solid Immersion Lenses for optical storage systems is described in U.S. Pat. Nos. 5,125,750 and 5,497,359.

The Solid Immersion Lens has been proposed as a means of increasing the optical storage areal storage density by moving from the far-field recording regime to the near-field recording regime. In far-field recording, the spacing between the nearest optical component and the recording medium is substantially greater than the wavelength of the recording light. In contrast, in near-field recording the separation is much less than the wavelength of the recording light. In order to maximize areal storage density, it is necessary to minimize the recording spot. It can be shown that the recording spot of an objective-Solid Immersion Lens pair is related as:

$$\text{spot size } \alpha(\lambda/NA) \qquad \text{Eq. 1}$$

where $\lambda$ is the wavelength of the light used to generate the spot and NA is the numerical aperture of the objective lens. In the absence of the SIL, $\lambda = \lambda_o$ where $\lambda_o$ is the wavelength of light in air. When the light spot is inside the SIL, then $\lambda = \lambda_o/n$ wherein n is the index of refraction of the SIL. Hence, by selecting a SIL material with a large index of refraction, the spot size can be reduced by 1/n since:

$$\lambda - \lambda_o/n \qquad \text{Eq. 2}$$

in the SIL.

Since the areal storage density varies roughly according to the inverse of the spot size squared, it can be shown that:

$$\text{Areal Density } \alpha(\text{spotsize})^{-2} \alpha (NA/\lambda)^2 \alpha n^2 \qquad \text{Eq. 3}$$

Thus, it is beneficial to work with high index materials. Typical optical glasses have an index in the range of 1.5–1.9.

Materials like sapphire, zirconia, and diamond have indexes which range from roughly 1.7–3. Hence, the areal density achievable with a SIL can be increased over that achievable with a single recording objective anywhere from 2.25 to 9. From a pure recording areal density perspective, such materials as zirconia and diamond are favored by virtue of their high index of refraction. However, one major problem with using materials like zirconia or diamond is their cost. When trying to volume manufacture objective-SIL lens pairs to increase optical storage capacity, this cost can have tremendous system implications.

The present invention provides a Solid Immersion Lens which, as desired, may be produced without incurring the cost of the exotic materials typically used in prior art Solid Immersion Lenses. The lens is easily fabricated and can be coupled to or integrated on a slider of the type used in disc storage systems. The invention recognizes that a desired spot size may be obtained with a non-hemispherical lens by fabricating a lensing system with the appropriate λ/NA. Further, the invention allows the Field-Of-View (FOV) of the lensing system to be optimized for a particular configuration. This is particularly important where it is desired to move the spot between adjacent tracks, without moving the slider.

FIG. 1 is a simplified illustration of an optical recording system 10 employing a Solid Immersion Lens in accordance with the present invention. System 10 includes optical disc 12 having a data surface which carries optically encoded information. Disc 12 rotates about spindle 14 and is driven by a spindle motor 16 mounted on base 18. A slider 20 is positioned proximate disc 12 and is coupled to an actuator 22 which includes armature 24 and actuator motor 26 which couples to base 18. Slider 18 includes optical elements 30 in accordance with the present invention. An optical source/sensor apparatus 32 is optically coupled to elements 30 through mirror 33. A controller 34 couples to apparatus 32, mirror 33, actuator 26 and data bus 36 and is used for controlling operation of system 10.

During operation, disc 12 rotates and slider 20 is positioned radially over the data surface of disc 12 using actuator 22. Controller 34 controls the position of slider 20, whereby information may be read from (and in some embodiments written to) the data surface of disc 12 using optical source/sensor apparatus 32 and optical elements 30. Precise control of spot position is achieved by controller 34 scanning the spot across the disc surface over several tracks. For example, this could be by moving mirror 33. The precise configuration of apparatus of 32 may be selected based upon the type of storage system 10 employed. In general, source/sensor apparatus 32 includes an optical source which directs light toward optical elements 30 for illuminating the data surface of disc 12. Light is reflected back through optical elements 30 from the data surface of disc 12 for detection by apparatus 32. Controller 34 senses the reflected signal which is converted to data for transmission on data bus 36.

Figure 2:
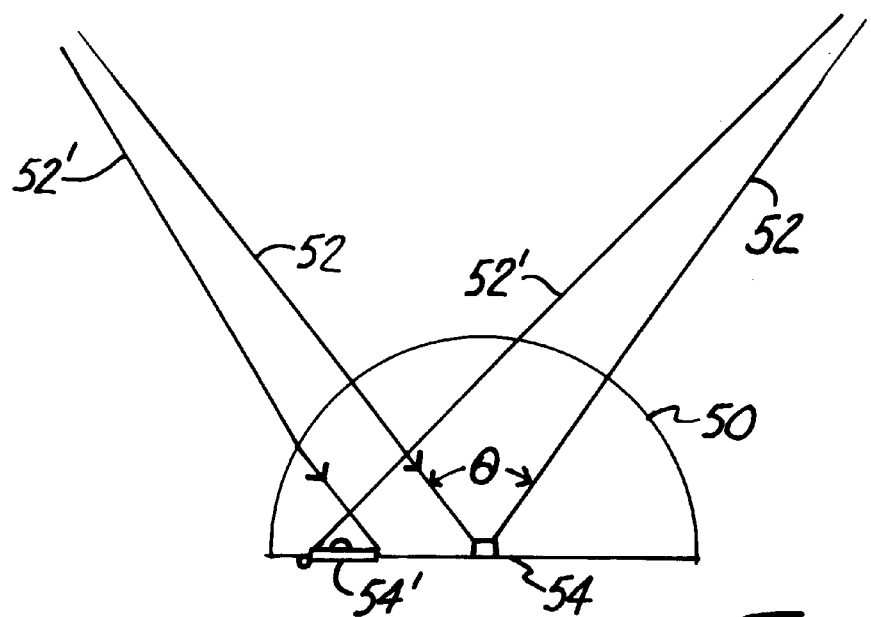
FIG. 2 is a cross-sectional view of a prior art Solid Immersion Lens.

One aspect of the present invention includes the recognition that prior art objective-SIL lens pairs utilize two important features in achieving spot reduction and the corresponding areal-density increase as set forth in Equations 1–3 above. First, the spot is typically generated at the bottom of the SIL and spot is kept inside the SIL. This allows the SIL material to reduce the effective wavelength of the light by the index of refraction of the SIL material in accordance with Equation 2. Secondly, the objective-SIL lens pair maintains the effective numerical aperture of the light inside of the SIL. This is equivalent to maintaining the solid angle of the cone of light from the objective lens which generates the spot inside the SIL. FIG. 2 illustrates these features and shows a prior art SIL 50 receiving light rays 52 from an objective lens. A spot 54 is formed at the bottom of SIL 50 and within SIL 50.

However, if the light source is moved off axis, such occurs when scanning adjacent data tracks, the spot size rapidly degrades. This is illustrated with rays 52' and spot 54'. As illustrated, rays 52' are not normal to the surface of SIL 50 and are therefore not optimally focussed. This causes spot 54' to "smear," thereby reducing the definition and the density of the system.

Using the above two features in one embodiment, the invention provides an objective—SIL lens pair for near field recording utilizing a non-hemispherical SIL. As used herein, "non-hemispherical" includes any lens shape which does not include a hemispherical portion (i.e., and therefore does not include a super-hemisphere), such as an aspherical lens or a lens of less than a hemisphere. In one aspect of the invention, the new lens pair is designed to maintain λ/NA to be substantially the same as the λ/NA for the prior art lens being replaced. Further, as the invention is not limited by the design constraints of prior art hemispherical SILs, the lens pair can improve the field-of-view (FOV) in comparison to prior art systems. This allows a greater range of placement options when positioning the light source relative to objective lens and when steering the spot with the mirror 33. In another aspect of the invention shown in FIG. 3, a SIL is provided having a surface which is less than a hemisphere.

Figure 3:
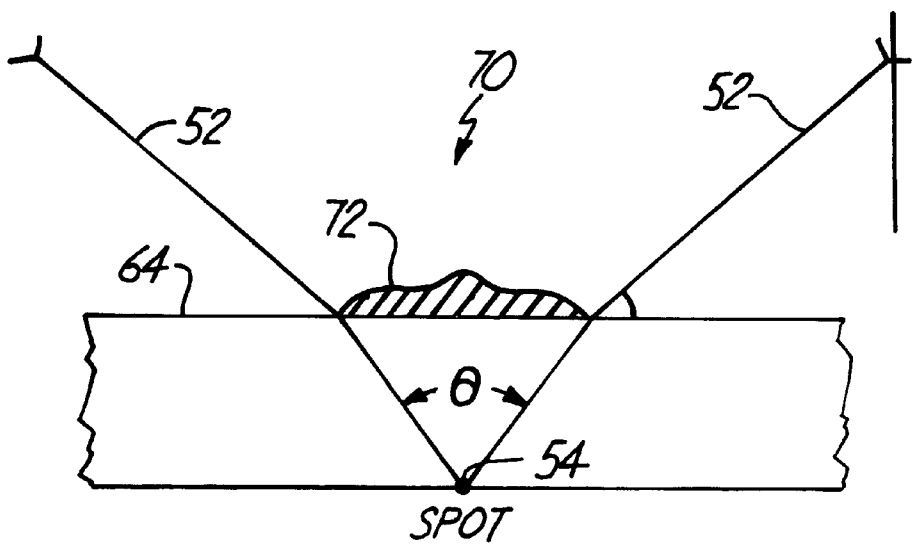
FIG. 3 is a cross-sectional view of a Solid Immersion Lens using a lens cap in accordance with another embodiment of the present invention.

FIG. 3 is a cross-sectional view of a SIL lens 70 in accordance with one preferred embodiment. Lens 70 includes a plano-convex asphere lens cap 72 mounted on optically transparent substrate 64. The embodiment of FIG. 3 is particularly advantageous because plano-convex asphere lens cap 72 does not need to have the same high index of refraction material as used for substrate 64. Thus, lens cap 72 may be fabricated using less expensive materials and materials which are more easily machined or molded such as glass. Cap 72 is easily fabricated through a molding process and thus offers significant cost savings over the high index of refraction full hemispherical lenses offered in the prior art. Further, one aspect of the invention includes fabrication of any desired non-hemispherical lens for the lens cap and the particular lens is not limited to the plano-convex asphere lens shown. This allows the optical characteristics of the SIL to be tailored as desired for specific applications, system characteristics, objective lens, etc. For example, the field of view may be adjusted as desired.

Figure 4:
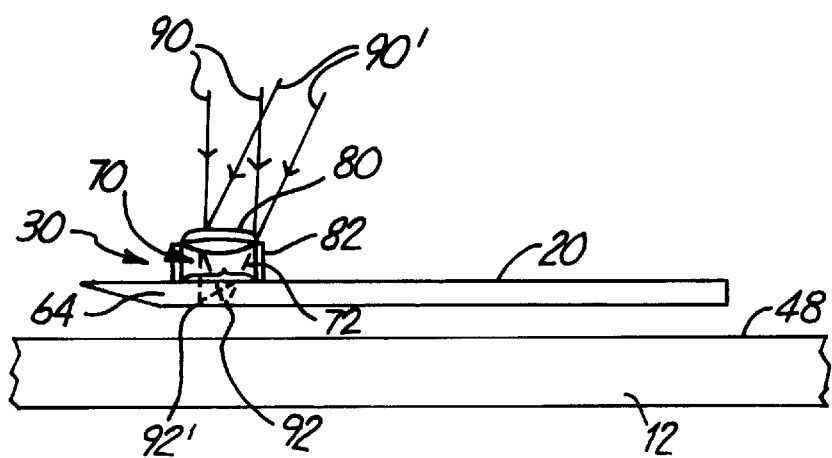
FIG. 4 is a cross-sectional view of a slide having a Solid Immersion Lens in accordance with one embodiment of the present invention.

FIG. 4 is a simplified side cross sectional view of slider 20 showing optical elements 30 in accordance with one embodiment of the present invention. Slider 20 is shown proximate the data surface 48 of optical disc 12. Elements 30 include SIL 70 and an objective lens 80. The SIL 70 can be a separate entity mounted on slider 20 or integrally combined with slider 20. Objective lens 80 is supported by a mounting member 82 above SIL 50. Mount 82 positions objective lens 80 such that the distance between objective lens 80 and SIL 70 is appropriate for their focal lengths. Note that in the embodiment of FIG. 4, substrate 64 is formed to provide slider 20.

FIG. 4 also illustrates an important feature of the invention, the off-axis performance of optical elements 30. As shown in FIG. 4, on-axis rays 90 provide a focussed spot 92 within substrate 64 for coupling to surface 48 using the near-field. However, to access an adjacent track, controller 34 need only scan the spot to provide off-axis beam 90'. This yields a focussed spot 92' which is offset from spot 92 allowing access to adjacent data without repositioning slider 20. Further, this benefit is achieved without undue manufacturing costs. The invention includes the recognition that the top surface of the SIL can have a non-spherical profile. This is particularly advantageous when coupled with a separate objective lens which provides a total of three separate surfaces which can be controlled to optimize spot size servoability. This can be achieved using known lens modeling techniques.

The non-hemispherical lens of the present invention is preferably cost effectively produced using the same processes used to produce the objective lens, for example objective lens 80. In one preferred embodiment, the plano surface of the plano-convex asphere lens is preferred due to reduced aberration and ease of assembly. However, the invention is not limited to such a design. Furthermore, in some embodiments, the optical characteristics of the objective lenses are preferably designed to properly match the SIL. One aspect of the invention includes a SIL using any "non-hemispherical" lens.

Although the present invention has been described with reference to preferred embodiments, workers skilled in the art will recognize that changes may be made in form and detail without departing from the spirit and scope of the invention. For example, the lens cap may be fabricated using any appropriate technique and bonded to or formed with the substrate as desired. The lens cap is not limited to the specific embodiments set forth herein. Furthermore, the substrate may take different forms as desired and is not limited to the shapes set forth herein. Further, the description herein refers generally to "optical" and "light," however, these terms are intended to include other, non-visible radiation such as infrared ultraviolet and beyond. The servo mechanism may be any appropriate device or technique and is not limited to the mirror arrangement set forth herein.

What is claimed is:

1. An optical disc storage system, comprising:
    an optical disc for storing information in an optically readable format on a data surface;
    a slider proximate the data surface of the optical disc;
    an actuator coupled to the slider to selectively position the slider relative to the data surface;
    a controller;
    a servo mechanism coupled to the controller and positioned to responsively servo the light beam between a plurality of servo positions;
    a light source providing a light beam;
    a Solid Immersion Lens coupled to the slider including an asperical surface facing the light source and an opposing substantially flat surface adapted for near-field coupling light to the data surface; and
    an objective lens between the servo mechanism and the Solid Immersion Lens, the objective lens and the asperical surface optically related to focus the light beam to a spot at a plurality of spot positions on the substantially flat surface of the Solid Immersion Lens corresponding to each of the plurality of servo positions.

2. The optical disc storage system of claim 1 wherein the Solid Immersion Lens is formed by a separate lens cap bonded to a substrate.

3. The optical disc storage system of claim 2 wherein the separate lens cap has an index of refraction which is different than the index of refraction of the substrate.

4. The optical disc storage system of claim 2 wherein the separate lens cap has an index of refraction which is substantially the same as an index of refraction of the substrate.

5. The optical disc storage system of claim 2 wherein the substrate comprises at least a portion of the slider.

6. The optical disc storage system of claim 2 wherein the separate lens cap is bonded along a substantially flat face to the substrate.

7. The optical disc storage system of claim 2 wherein the separate lens cap comprises a molded lens.

8. The optical disc storage system of claim 2 wherein the substrate comprises glass.

9. The optical disc storage system of claim 2 wherein the lens cap comprises glass.

10. The optical disc storage system of claim 1 wherein the Solid Immersion Lens has a focal point located therein.

11. The optical disc storage system of claim 1 wherein the Solid Immersion Lens has a focal point located a distance below the Solid Immersion Lens and adjacent the data surface.

12. The optical disc storage system of claim 1 wherein the Solid Immersion Lens comprises a plano-convex lens.

13. The optical disc storage system of claim 1 wherein the servo mechanism comprises a mirror.

14. The optical disc storage system of claim 1 wherein the plurality of servo positions and plurality of spot positions correspond to data tracks on the data surface of the optical disc.

15. The optical disc storage system of claim 1 wherein the spot has a spot size and the spot size at each of the plurality of spot positions is less than a predetermined maximum which is related to recording density.

* * * * *